United States Patent [19]
Katoh et al.

[11] Patent Number: 5,787,318
[45] Date of Patent: Jul. 28, 1998

[54] CAMERA HAVING ADJUSTABLE APERTURE

[75] Inventors: Minoru Katoh, Kawasaki; Hiroshi Wakabayashi, Yokohama; Kiyosada Machida, Urawa, all of Japan

[73] Assignee: Nikon Corporation, Tokyo, Japan

[21] Appl. No.: 968,494

[22] Filed: Nov. 12, 1997

Related U.S. Application Data

[63] Continuation of Ser. No. 655,913, May 31, 1996, abandoned.

[30] Foreign Application Priority Data

Jun. 1, 1995 [JP] Japan .................................. 7-135032

[51] Int. Cl.$^6$ ........................................ G03B 17/00
[52] U.S. Cl. ........................ 396/442; 396/440; 396/539
[58] Field of Search .......................... 396/89, 440, 441, 396/442, 535, 539; 352/221

[56] References Cited

U.S. PATENT DOCUMENTS 3,103,861  9/1963  Koeppe .................. 354/203
4,364,653  12/1982  Terada .................. 354/203

Primary Examiner—A. A. Mathews

[57] ABSTRACT

A camera in which lenses in a lens system can be easily adjusted and manufacturing steps can be eliminated. The camera is equipped with an aperture which regulates the exposure region of a film, and a pressure plate with a tool insertion aperture hole formed in a region opposite the aperture. The tool insertion hole is disposed at the back surface of the aperture. This tool insertion hole allows for easy and efficient adjustment of the lenses making up the camera's lens system. Usually, the lens system is a zoom lens system.

15 Claims, 5 Drawing Sheets

CAMERA HAVING ADJUSTABLE APERTURE

This application is a continuation of application Ser. No. 08/655,913, filed May 31, 1996, now abandoned.

CROSS REFERENCE TO RELATED APPLICATIONS

This application is based upon and claims priority from Japanese Patent Application No. 07-135032 filed Jun. 1, 1995, the contents of which are hereby incorporated herein by reference.

BACKGROUND OF THE INVENTION

1. Field of the Invention

The present invention relates to a camera which has a pressure plate structure which allows adjustment of a lens in a lens barrel with a high degree of efficiency.

2. Description of the Related Art

FIG. 10 is a cross sectional diagram of a prior art camera. Lens barrel 1, which receives lens 1a and lens 1b, is disposed in the center portion of the camera. Cartridge compartment 2 on the left-hand side of the camera receives a film cartridge (not shown) while spool compartment 3 on the right-hand side of the camera takes up or spools the film once it has been exposed. The film is drawn out from the film cartridge loaded in cartridge compartment 2 and extending between compartment 2 and spool compartment 3. Further, the film is exposed to light at the rear side of lens barrel 1. Aperture 10 is open at the rear side of lens barrel 1, and pressure plate 11 extends left and right at the rear side of aperture 10 and is formed integrally with body B. Also found in the camera according to the prior art are lens barrel motor 17a and main capacitor 18, both forward of cartridge compartment 2, first mounting member 16 rearward of cartridge compartment 2 and second mounting member 19 left of cartridge compartment 2. Moreover, battery 14 is received rearward of pressure plate 11. Front cover 21 constitutes the front surface and side surfaces of the camera, and rear cover 12 constitutes the back surface of the camera. Front and rear covers 21, 12 accept all other elements of the camera.

In the process of manufacturing a camera such as that shown in FIG. 10, lenses 1a, 1b, which are usually elements of a zoom lens system, are received in lens barrel 1. Such lenses require adjustment after lens barrel 1 has been mounted in the camera. In order to perform the insertion of a tool from the rear side of the lens barrel for making the adjustment, it is necessary to detach the camera members which are rearward of lens barrel 1 at the time of adjustment. However, in such a camera, removing and replacing each of the members: pressure plate 11, battery 14, rear cover 12, first mounting member 16, etc., requires a great deal of work effort. Due to this extra effort required to adjust lenses 1a, 1b in lens barrel 1, the manufacturing cost associated with the camera increases.

SUMMARY OF THE INVENTION

Accordingly, it is an object of the present invention to provide a camera in which lens elements forming a lens system such as a zoom lens can be easily adjusted, and for which the amount of work involved in the adjustment process can be reduced, thereby decreasing the manufacturing cost of the camera.

Objects of the present invention are achieved by a camera comprising a lens system, an aperture that regulates the exposure region of a film, and a pressure plate disposed at a rear surface of the aperture, the pressure plate including a hole facing the aperture, wherein the hole and the aperture are aligned with the lens system. The hole is used for inserting a tool therein to adjust the lens. The camera can be adjusted via the tool insertion aperture hole, which has been formed in the region opposite the aperture of the pressure plate.

The camera may further include a rear cover located in the camera back surface side of the pressure plate and which forms the back surface of the camera. Furthermore, an insertion member may be inserted into the aperture hole to obstruct the aperture hole. When the rear cover is mounted to the camera, the insertion member inserted in the aperture hole blocks light. Moreover, in the detached state of the rear cover, the camera can be adjusted via the aperture hole.

Furthermore, such an insertion member that has been inserted into the aperture hole so as to block the aperture hole preferably includes a surface flush with the pressure plate. When the rear cover plate is mounted, the camera front side surface of the insertion member inserted into the aperture hole becomes about flush with the pressure plate. Also, light shielding structures may be formed for the prevention of stray light from striking the film. Such light shielding members are formed in the periphery of the insertion member of the rear cover and the periphery of the aperture hole of the pressure plate. When the rear cover is mounted on the camera body, the insertion member is inserted into the aperture hole. Moreover, the light shielding structure, installed between the pressure plate and the rear cover, excludes stray light from exposing the film. A battery compartment is usually disposed in the rear cover.

The camera also includes a rear cover which serves as a back surface of the camera located at the camera back surface side of the pressure plate. Further, to make it even easier to access the lenses in the lens system, additional aperture holes are provided that open towards the camera rear cover from the aperture hole.

The rear cover of the camera may include a receiving compartment for receiving elements such as batteries for operating the camera. The receiving compartment includes first and second holes that pass therethrough so as to allow communication between the camera exterior and interior, thus allowing lens adjustment without requiring the removal of any camera pieces, except for insertion members that obstruct the holes when the camera is operational so as to prevent light from entering the camera and damaging the film.

It is preferable that the size of the first hole be larger than the size of the aperture hole in the pressure plate. As noted above, a light-shielding member obstructs the aperture hole of the pressure plate from the camera back surface side. This light-shielding member is received in the first hole. The aperture hole of the pressure plate is screened from light by means of a light screening member. Another light-shielding member may be present that obstructs the aperture hole of the pressure plate.

The camera may also include an aperture that regulates the exposure region of a film, and a rear cover that is located in the camera back surface side of the aperture and which serves as the back surface of the camera. Furthermore, the rear cover also serves as a pressure plate portion, which sets the position of the film on a camera front surface portion opposite the aperture. When the rear cover is detached from the pressure plate portion formed in the rear cover, the aperture is exposed.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
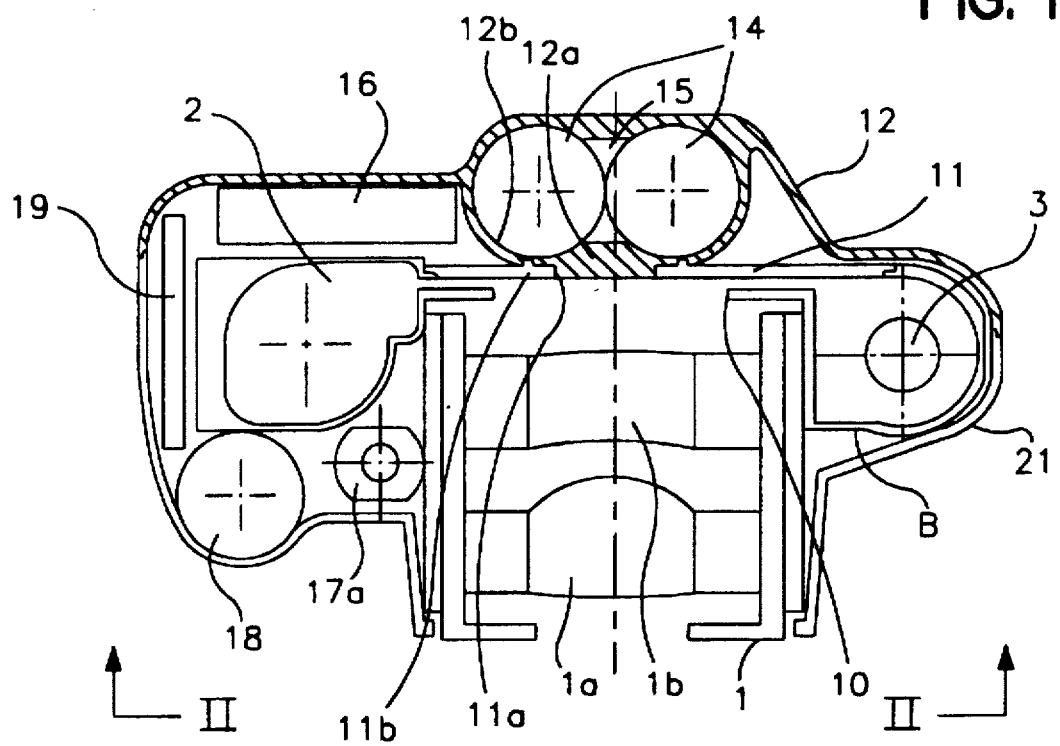
FIG. 1 is a transverse cross sectional view showing a first embodiment of a camera according to the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
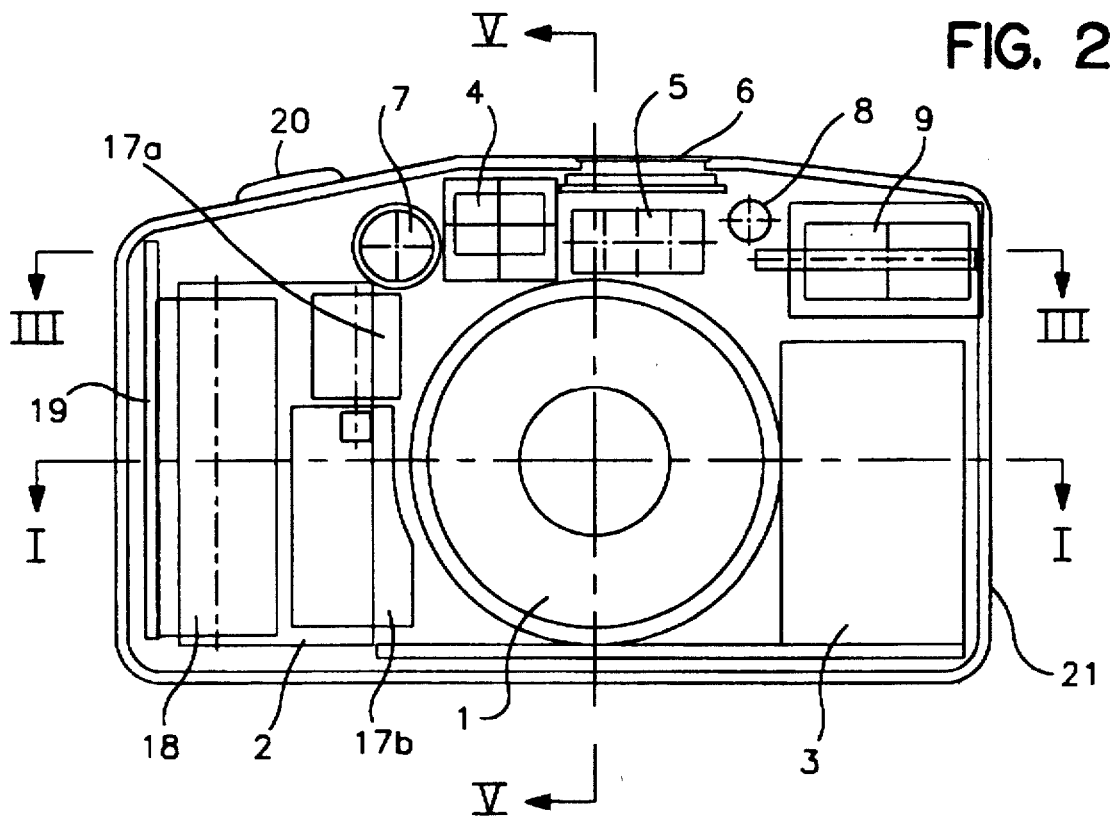
FIG. 2 is a front view of a camera of the first embodiment in the direction of lines II—II in FIG. 1.
Figure 10:
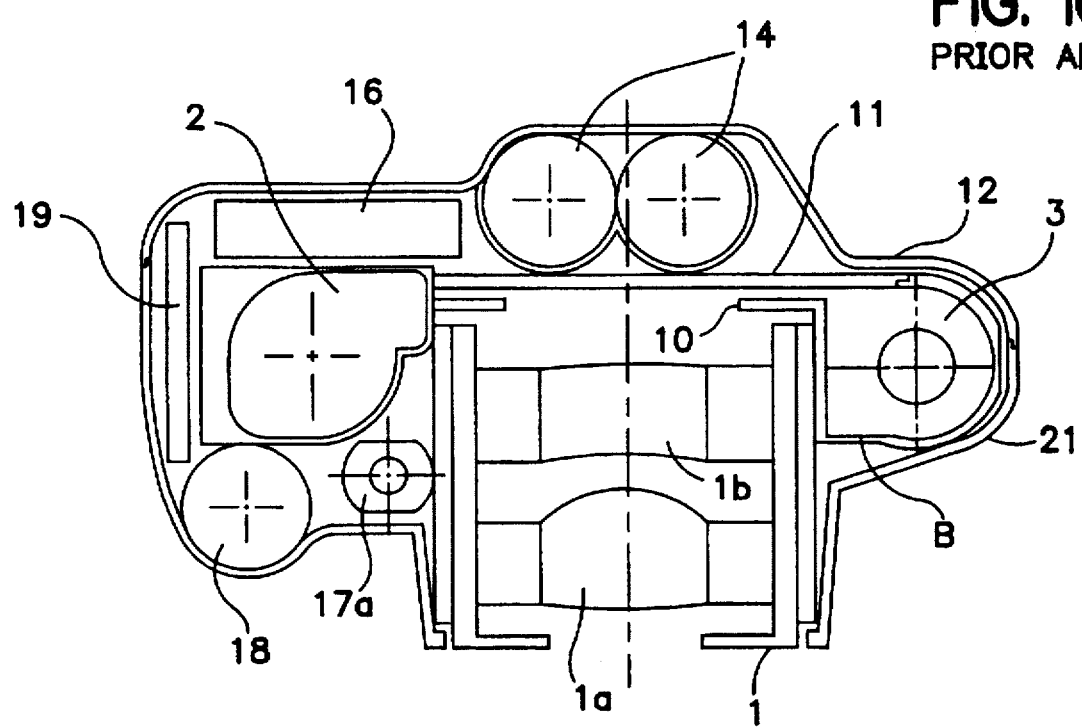
FIG. 10 is a transverse cross sectional view of a prior art camera.

FIG. 1 through FIG. 5 illustrate a first embodiment of a camera having a pressure plate structure according to the present invention. In places which are similar to FIG. 10, which shows the prior art, the same reference symbols are used and their description is omitted. In FIG. 2, viewfinder 4 is on the upper left side of lens barrel 1, and autofocus unit 5 is disposed on the right-hand side of lens barrel 1. Above autofocus unit 5, LCD display unit 6 equipped with a display unit is disposed on the top side of the camera. Furthermore, supplementary light source 7 of autofocus unit 5 is to the left of the viewfinder 4, and photometric sensor 8 and zoom strobe 9 are mounted on the right-hand side of autofocus unit 5.

Figure 5:
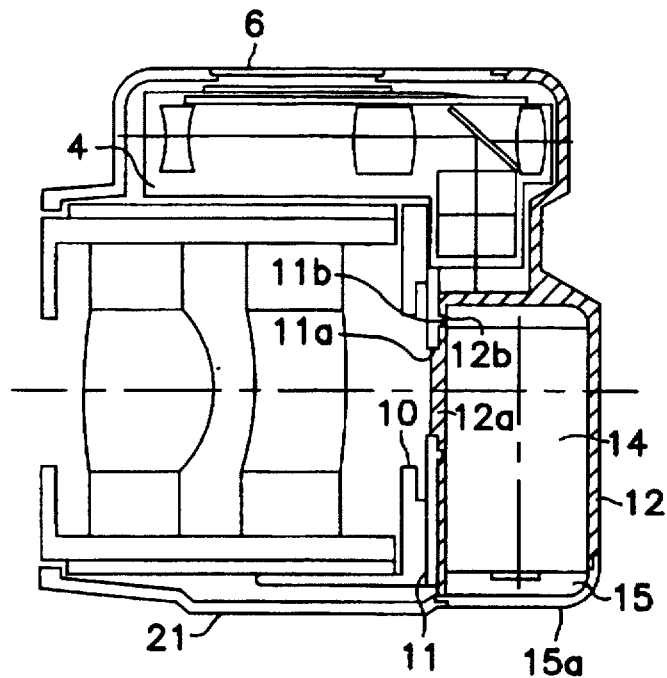
FIG. 5 is a sectional view taken along the lines V—V of FIG. 2.

As shown in FIG. 1 and FIG. 5, pressure plate 11 extends to the left and right, rearward of aperture 10 which opens in camera body B to the rear of lens barrel 1. Rearward of pressure plate 11, integrally formed with rear cover 12 which covers the back surface of the camera, battery compartment 15 is disposed and accommodates two batteries 14. As shown in FIG. 5, batteries 14 are inserted and removed by opening cover 15a of battery compartment 15. Cover 15a is disposed in the bottom surface of the camera.

Figure 4:
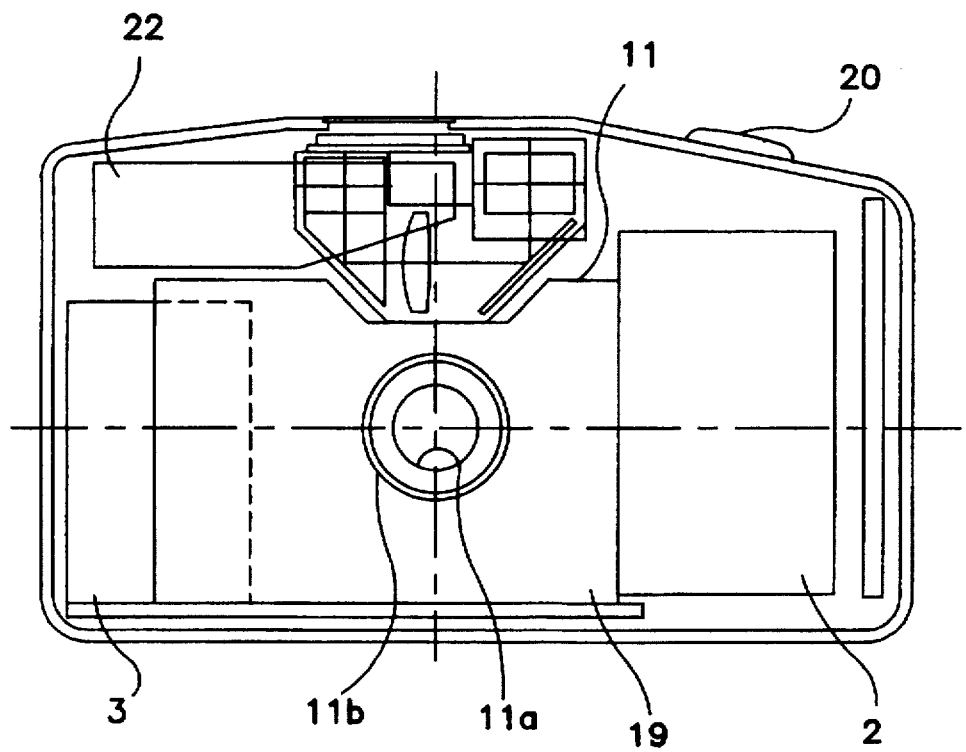
FIG. 4 is a back view showing the state with the rear cover removed from a camera according to the first embodiment.

As shown by FIGS. 1, 4 and 5, circular aperture hole 11a is formed in pressure plate 11 at the point of intersection with the optic axis of lens barrel 1. Moreover, projecting portion (insertion member) 12a is inserted in aperture hole 11a, and is of a cylindrical shape. Insertion member 12a has about the same shape as aperture hole 11a, and projects forward from rear cover 12, which encompasses the battery compartment 15. Insertion member 12a obstructs aperture hole 11a and also supports the film from the back surface side by means of the front surface of insertion member 12a, which is disposed flush with pressure plate 11. Ring-shaped convex portion 11b in the periphery of aperture hole 11a of pressure plate 11 mates with ring-shaped concave portion 12b formed in the periphery of insertion member 12a of cover 12, by means of engaging convex portion 11b and concave portion 12b. Thus, a zig-zag shape is formed at the junction between the pressure plate 11 and the rear cover 12, and stray light is prevented from passing through aperture hole 11a and striking the film, thereby damaging the photograph or destroying the exposed film.

Figure 3:
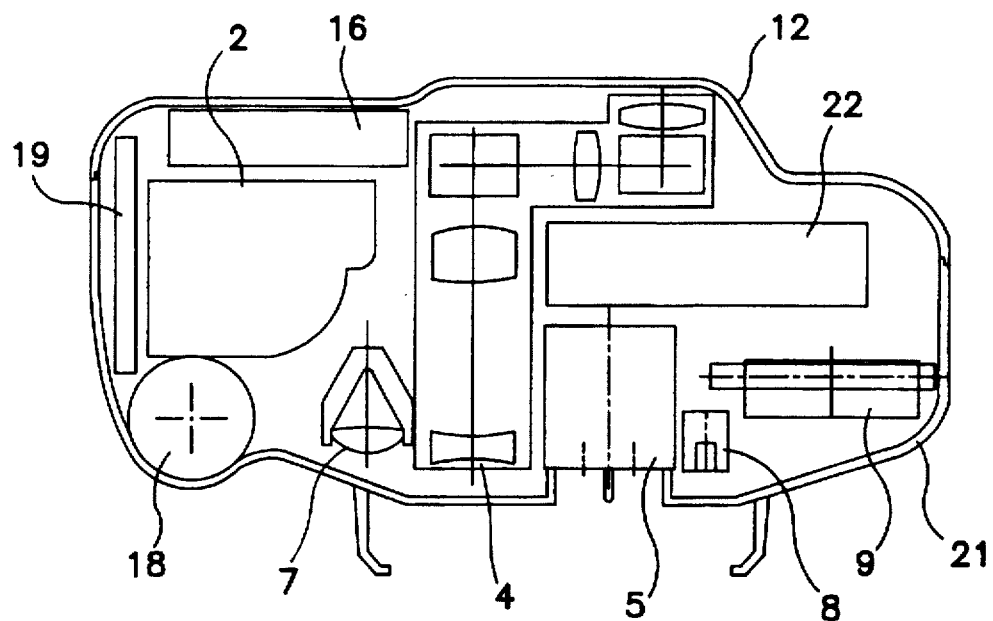
FIG. 3 is a sectional view taken along lines III—III of FIG. 2.

As shown in FIGS. 2 and 4, release button 20 is disposed in the top side of the camera, above cartridge compartment 2. As shown in FIG. 3, strobe mounting 22 is disposed extending left and right, rearward of autofocus unit 5. Moreover, viewfinder 4 extends between the camera front side and the camera back side and is curved in an approximate L shape. The camera front surface, side surfaces, bottom surface and top surface are covered by front cover 21, which is connected to rear cover 12.

In the manufacturing process, the lenses 1a and 1b built into the lens barrel 1 are adjusted after the lens barrel 1 has been mounted in the camera. The adjustment is performed in a state with rear cover 12 removed, i.e., before mounting rear cover 12. As shown in FIGS. 1, 4 and 5, when rear cover 12 is removed, a tool can be inserted into lens barrel 1 from the camera back surface through aperture hole 11a in pressure plate 11, and it is possible to adjust the lenses. Rear cover 12 can be mounted onto the camera after the adjustment.

Figure 6:
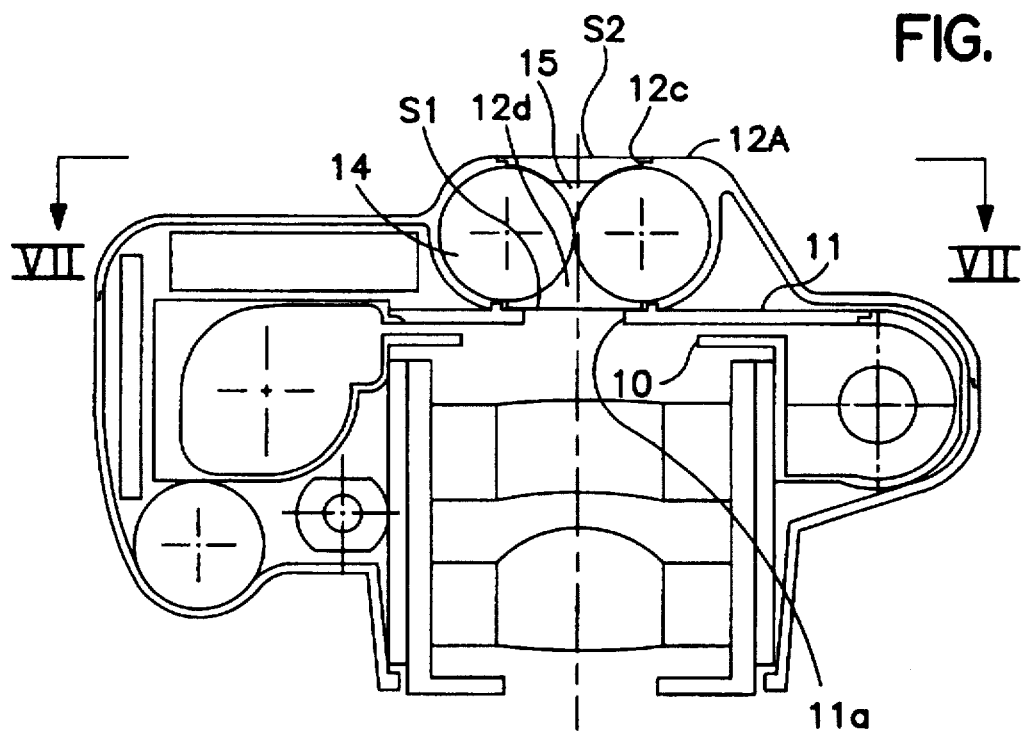
FIG. 6 is a transverse sectional diagram showing a second embodiment of a camera according to the present invention.
Figure 7:
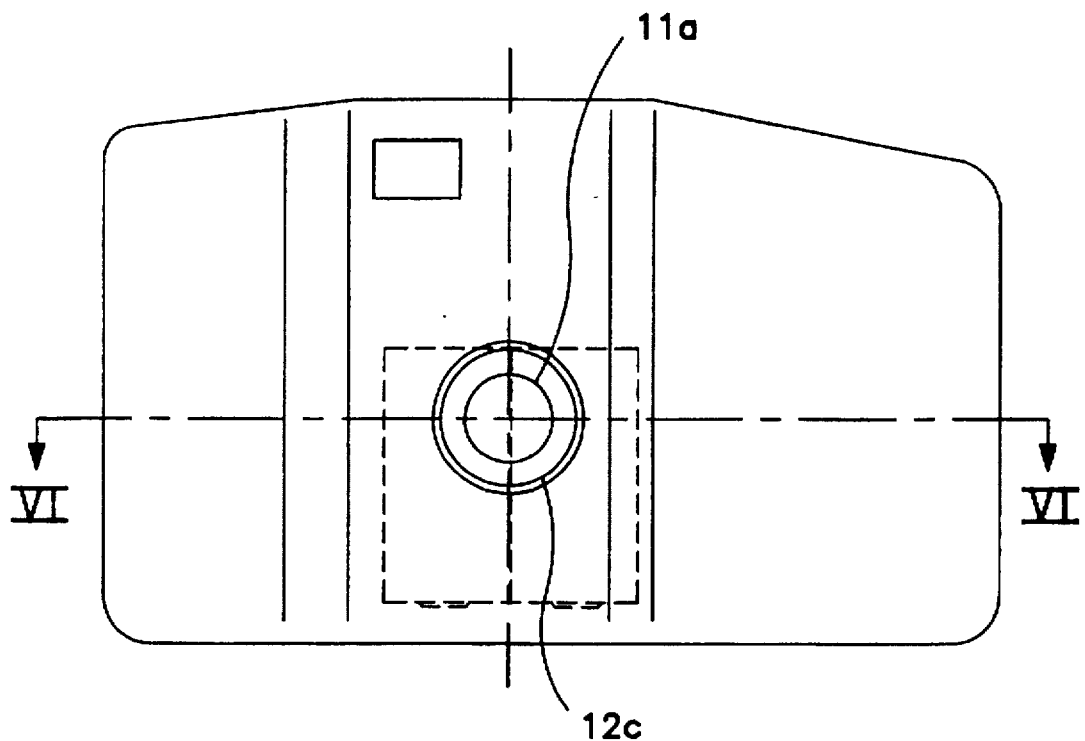
FIG. 7 is a back view of the camera of the second embodiment taken in the direction of lines VII—VII in FIG. 6.

In a second embodiment of a camera according to the present invention, rear cover 12A will be the primary focus of description. As shown in FIGS. 6 and 7, the aperture of aperture hole 11a is obstructed by shielding member S1 of slightly larger diameter than aperture hole 11a. Shielding member S1 obstructs aperture hole 11a from the back surface side of aperture hole 11a of pressure plate 11. Moreover, second aperture hole (first aperture) 12d is formed and has a slightly larger diameter than the shielding plate S1. Aperture hole 12d is in a position opposite the aperture hole 11a, and is formed in the front wall of battery compartment 15. Furthermore, third aperture hole (second aperture) 12c is formed to open in the back wall of battery compartment 15 in a position opposite aperture hole 12d. Aperture hole 12c is obstructed by means of a shielding member S2. In this manner, aperture holes 11a and 12d are arranged on the optical axis of the camera and aperture hole 12c is disposed rearward of aperture hole 12d on the back surface of the back cover 12A.

When battery or batteries 14 is/are taken out and shielding member S1 and shielding member S2 are removed, a tool can be inserted into the lens barrel 1 from the camera back surface through the aperture holes 12c, 12d, and 11a in that order from the exterior of the camera. Adjustment of the lenses 1a and 1b can be performed in this state. After the adjustment, the assembly of the camera can be concluded simply by the operation of only mounting the shielding members S1 and S2.

Figure 8:
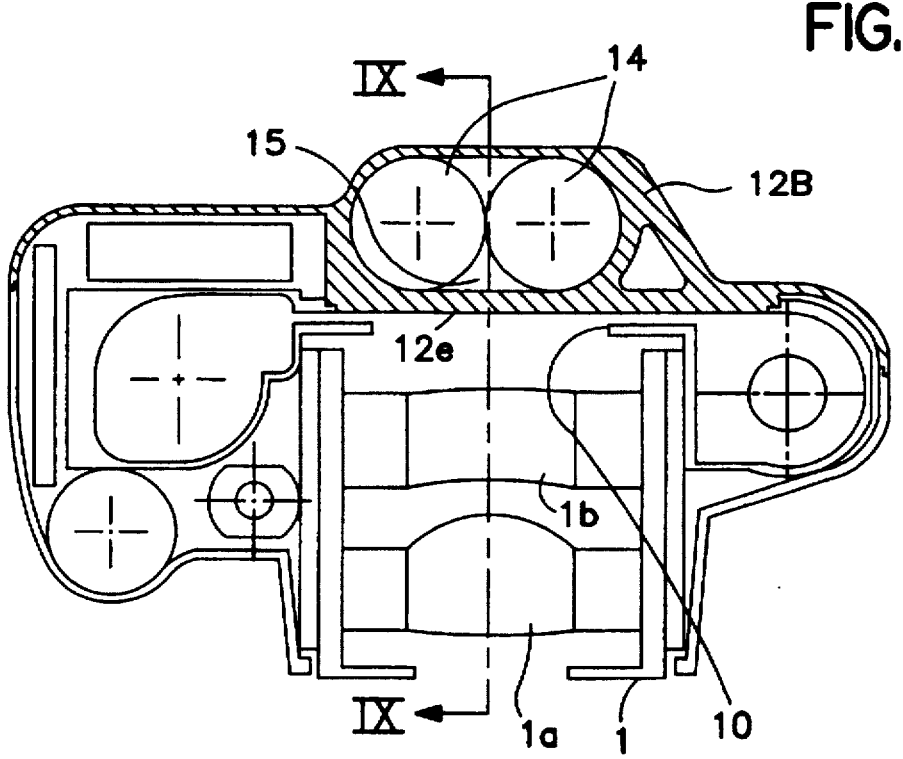
FIG. 8 is a transverse sectional diagram of a third embodiment of a camera according to the present invention.
Figure 9:
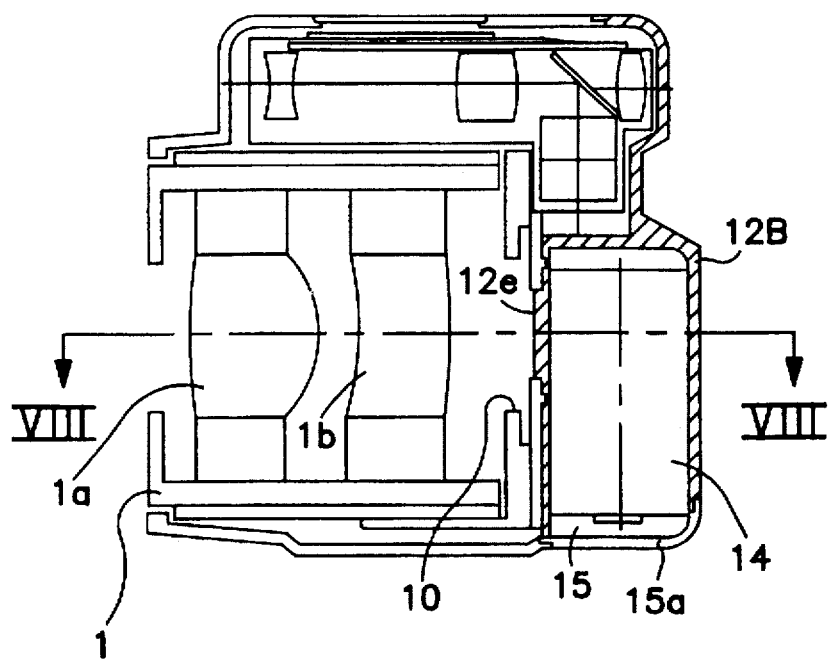
FIG. 9 is a sectional view taken along the line IX—IX of FIG. 8.

According to a third embodiment of a camera according to the present invention, as shown in FIGS. 8 and 9, rear cover 12B is equipped with battery compartment 15, which receives two batteries 14, in the central portion of the camera, and covers the camera from the back surface. Battery compartment 15 is opened and closed by means of cover 15a disposed in the camera bottom surface. As shown in FIG. 8, the front surface (pressure plate portion) 12e of the front wall of battery compartment 15 is formed in a flat surface, and is opposite aperture 10. Front surface 12e functions as the pressure plate of the camera.

In the state with rear cover 12B detached (before mounting of the rear cover 12B), the back surface side of lens barrel 1 is exposed to the camera exterior. Accordingly, by the insertion of a tool from the back surface side of the lens barrel 1, it is possible to easily adjust lenses 1a, 1b.

Moreover, in the third embodiment, the pressure plate portion 12e which functions as the pressure plate is disposed integrally with the rear cover 12, but a member functioning as a pressure plate and separate from rear cover 12 may also be mounted in rear cover 12. Mounting the separate member via an elastic member in the rear cover, it may be received in a predetermined position (a position to function as a pressure plate) during mounting in the camera.

The present invention can be applied to a camera using film which can be pushed out by the rotation of a cartridge shaft, and also in a camera using 135 film. Moreover, although preferred embodiments of the invention have been described with reference to particular structures for a camera, other types of cameras and photographic optical systems can encompass the invention.

According to the first embodiment, a tool insertion aperture hole is disposed in the pressure plate, thus allowing lenses in the lens barrel to be adjusted with the pressure plate mounted and undisturbed, by means of the insertion of a tool through the aperture hole. Accordingly, the operations of dismantling and reassembling the camera are eliminated, and the manufacturing cost is reduced.

Obstructing the aperture hole by just inserting an insertion portion of the rear cover in the aperture hole allows for easy dismantling and reassembling of the camera before and after adjustment because no other members are necessary. Because the pressure plate surface of the insertion portion is flush with the pressure plate, the aperture hole can have no adverse effects on the performance of the camera. As the receiving compartments may be removed simultaneously with the rear cover, operations before and after the adjustment are eliminated.

Because it is possible to insert a tool to the lens barrel through the aperture hole of the rear cover and the aperture hole of the pressure plate, it is not necessary to detach the pressure plate and the rear cover during the adjustment. Accordingly, the operations of dismantling and reassembling the camera before and after adjustment are eliminated, and the manufacturing cost is reduced.

Since a tool may be inserted into the lens barrel through the aperture hole of the rear cover, the second aperture, the receiving compartment and the first aperture, it is not necessary to detach the pressure plate and the rear cover during the adjustment. Accordingly, the operations of dismantling and reassembling the camera before and after adjustment are eliminated, and costs associated with manufacturing the camera are decreased.

Because the second aperture has been formed larger than the aperture hole of the pressure plate, the aperture hole can be obstructed by a light shielding member from the camera back surface side.

As a pressure plate portion functioning as a pressure plate is disposed integrally with the rear cover, a tool can be inserted into the lens barrel by just removing the rear cover. Accordingly, a process is eliminated and the manufacturing cost can be reduced.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A camera comprising:

a lens system;

an aperture that regulates the exposure region of a film; and a pressure plate disposed at a rear surface of said aperture, said pressure plate including a hole facing the aperture;

wherein said hole and said aperture are aligned with said lens system, wherein said pressure plate includes a rear cover serving as a back surface of the camera; and wherein an insertion member obstructs said hole when said rear cover is closed.

2. A camera according to claim 1, wherein when said insertion member is inserted in said hole, said insertion member has a surface flush with said pressure plate.

3. A camera according to claim 1, wherein light shielding structures are formed to block stray light, and said light shielding structures fit in a periphery of the insertion member and in a periphery of the hole in said pressure plate.

4. A camera according to claim 2, wherein light shielding structures are formed to block stray light, and said light shielding structures fit in a periphery of the insertion member and in a periphery of the hole in said pressure plate.

5. A camera according to claim 1, wherein a battery compartment is disposed in said rear cover.

6. A camera according to claim 2, wherein a battery compartment is disposed in said rear cover.

7. A camera according to claim 3, wherein a battery compartment is disposed in said rear cover.

8. A camera comprising:

a lens system;

an aperture that regulates the exposure region of a film;

a pressure plate disposed at a rear surface of said aperture, said pressure plate including a hole facing the aperture, wherein said hole and said aperture are aligned with said lens system;

a rear cover which serves as a back surface of the camera disposed at a camera back surface side of the pressure plate, said back cover including at least one aperture hole opening toward the back surface of the camera from said hole in said pressure plate.

9. A camera according to claim 8, further comprising a light shielding member which obstructs the hole of the pressure plate.

10. A camera, comprising:

a lens system with an optical axis;

an aperture that regulates the exposure region of a film;

a pressure plate disposed at a back surface of said aperture, said pressure plate having a first aperture hole disposed therein opposite said aperture; and a rear cover including a receiving compartment that receives an object, a second aperture hole between said receiving compartment and said first aperture hole, and a third aperture hole between said receiving compartment and a rear exterior of said camera;

wherein said rear cover forms a back surface of the camera; and wherein said aperture, said first aperture hole, said second aperture hole, and said third aperture hole are aligned along the optical axis of said lens system.

11. A camera according to claim 10, wherein the second aperture hole has a greater size than said first aperture hole.

12. A camera according to claim 10, further comprising a light shielding member which obstructs the first aperture hole from a camera back surface side, and which is received in the second aperture hole.

13. A camera according to claim 10, further comprising a light shielding member which obstructs the first aperture hole of the pressure plate.

14. A method for adjusting lenses in a camera, said method comprising the steps of:

providing a camera having a lens system, an aperture, and a pressure plate with a hole therein disposed so that the aperture and the hole are aligned on an optical axis of the lenses in the lens system;

assembling said camera from a plurality of components;

accessing said lenses with a tool via said hole in said pressure plate, through both the hole and the aperture to thereby adjust said lenses; and removing said tool from said camera.

15. A camera comprising:

a tool-adjustable lens system;

a first aperture that regulates the exposure region of a film; and a pressure plate disposed at a rear surface of said aperture, said pressure plate including a second aperture facing the first aperture, wherein said second aperture and said first aperture are aligned with said lens system to allow a tool to access said tool-adjustable lens system for tool adjustment of said lens system.

* * * * *